United States Patent
Killat

(10) Patent No.: US 9,815,977 B2
(45) Date of Patent: Nov. 14, 2017

(54) PROCESS FOR PREPARING DISPERSION POWDERS

(71) Applicant: Wacker Chemie AG, Munich (DE)

(72) Inventor: Stefan Killat, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 218 days.

(21) Appl. No.: 14/782,875

(22) PCT Filed: Mar. 25, 2014

(86) PCT No.: PCT/EP2014/055902
§ 371 (c)(1),
(2) Date: Oct. 7, 2015

(87) PCT Pub. No.: WO2014/166727
PCT Pub. Date: Oct. 16, 2014

(65) Prior Publication Data
US 2016/0060448 A1    Mar. 3, 2016

(30) Foreign Application Priority Data

Apr. 10, 2013  (DE) .................. 10 2013 206 267

(51) Int. Cl.
| | |
|---|---|
| B01J 2/04 | (2006.01) |
| B01D 1/18 | (2006.01) |
| B01D 1/20 | (2006.01) |
| C08J 3/12 | (2006.01) |
| C08L 31/04 | (2006.01) |
| C08L 27/06 | (2006.01) |
| F26B 3/12 | (2006.01) |
| B01J 2/06 | (2006.01) |

(52) U.S. Cl.
CPC ............ *C08L 31/04* (2013.01); *B01D 1/18* (2013.01); *B01J 2/06* (2013.01); *C08J 3/122* (2013.01); *C08L 27/06* (2013.01); *F26B 3/12* (2013.01); *C08J 2327/06* (2013.01); *C08J 2331/04* (2013.01); *C08J 2429/04* (2013.01)

(58) Field of Classification Search
None
See application file for complete search history.

(56) References Cited

U.S. PATENT DOCUMENTS

| | | | |
|---|---|---|---|
| 4,481,328 A | 11/1984 | Harreus et al. | |
| 4,892,932 A | 1/1990 | Rauch et al. | |
| 5,225,478 A | 7/1993 | Beckerle et al. | |
| 5,519,084 A * | 5/1996 | Pak-Harvey | C09D 133/064 524/503 |
| 6,576,698 B1 | 6/2003 | Weitzel | |
| 7,820,738 B2 | 10/2010 | Pietsch et al. | |
| 2003/0141378 A1 | 7/2003 | Raehse et al. | |
| 2004/0145069 A1 | 7/2004 | Low | |
| 2008/0098933 A1 | 5/2008 | Killat | |
| 2011/0160350 A1 | 6/2011 | Bergman et al. | |
| 2011/0257305 A1* | 10/2011 | Kim-Habermehl | C04B 24/2652 524/8 |
| 2014/0167299 A1 | 6/2014 | Herbert et al. | |

FOREIGN PATENT DOCUMENTS

| | | |
|---|---|---|
| DE | 3101413 A1 | 7/1982 |
| DE | 44 06 822 A1 | 9/1995 |
| DE | 19752435 A1 | 5/1999 |
| DE | 10241447 A1 | 3/2004 |
| DE | 10321759 A1 | 12/2004 |
| DE | 10 2011 080 233 A1 | 2/2013 |
| EP | 0 332 067 A1 | 9/1989 |
| EP | 0 407 889 A1 | 1/1991 |
| EP | 1 000 113 B1 | 5/2000 |
| EP | 1 110 978 B1 | 6/2001 |
| EP | 1 720 933 B1 | 11/2006 |
| EP | 1 916 275 A1 | 4/2008 |
| EP | 2 341 084 A1 | 7/2011 |
| WO | 01/83071 A1 | 11/2001 |

OTHER PUBLICATIONS (http://www.lsbu.ac.uk/water/water_phase_diagram.html); Water Phase Diagram, pp. 1-4, Dec. 21, 2015.
Polymer Handbook, 2nd Edition, J. Wiley & Sons, New York (1975).
Fox, T.G., Bull. Am. Physics Soc. 1, 3, p. 123 (1956).
W. Rahse et al., "Produktdesin disperser Stoffe: Industrielle Spruehtrocknung", Chemie Ingenieur Technik, 2009, 81. No. 6. pp. 699-716 and English Abstract.
J. Schulze, "Redispersionspulver im Zement", TIZ-Fachberiechte, vol. 109, No. 9, 1985, pp. 698-703 and English Abstract.
Encyclopedia of Polymer Science and Engineering, vol. 8 (1987), John Wiley & Sons, pp. 659-677.

\* cited by examiner

*Primary Examiner* — Mary F Theisen
(74) *Attorney, Agent, or Firm* — Brooks Kushman P.C.

(57) ABSTRACT

The invention provides a process for preparing dispersion powders by spray drying of aqueous polymer dispersions of polymers of one or more ethylenically unsaturated monomers selected from the group encompassing vinyl esters, methacrylic esters, acrylic esters, olefins, dienes, vinylaromatics, and vinyl halides with a drying gas in a nozzle atomization dryer, characterized in that the aqueous polymer dispersion (feed), before being atomized, is preheated under pressure to a temperature of 100° C. to 200° C. and is atomized at this temperature, the pressure being set such that the aqueous phase of the polymer dispersion does not boil at the temperature selected.

10 Claims, No Drawings

PROCESS FOR PREPARING DISPERSION POWDERS

CROSS REFERENCE TO RELATED APPLICATIONS

This application is the U.S. National Phase of PCT Appln. No. PCT/EP2014/055902 filed Mar. 25, 2014, which claims priority to German Application No. 10 2013 206 267.2 filed Apr. 10, 2013, the disclosures of which are incorporated in their entirety by reference herein.

BACKGROUND OF THE INVENTION

1. Field of the Invention

The invention relates to a process for preparing dispersion powders by spray drying of aqueous polymer dispersions in a nozzle atomization dryer.

2. Description of the Related Art

Dispersion powders are polymer powders which are obtainable by spray drying of the corresponding aqueous polymer dispersions. A distinction is made between dispersion powders which are redispersible in water, and those which do not have this property. Water-redispersible polymer powders are obtained generally by drying of the corresponding aqueous polymer dispersions, in the presence of a drying aid (generally a protective colloid), optionally, of an antiblocking agent and, optionally, further additives. The protective colloid fraction on the one hand prevents irreversible sticking of the polymer particles to one another during the drying operation, the polymer particles being enveloped by the protective colloid particles. On the other hand, this protective colloid matrix, which dissolves again when the polymer powder is dispersed in water, has the effect that in the aqueous redispersion, the polymer particles are present again with the particle size of the original dispersion (TIZ-Fachberichte, 1985, Vol. 109 (9), 698).

In the case of dispersion powders which are not to be redispersible, it is possible optionally to do without the addition of protective colloid at the drying stage.

In order to minimize instances of powder blocking, particularly in the case of dispersion powders based on polymers having a glass transition temperature Tg of ≤25° C., and in order to improve pourability and flowability, antiblocking agents (anticaking agents) are added to the dispersion powders during their preparation. The antiblocking agent may be added during the drying step, or after drying.

The antiblocking agent (ABA) serves to ensure the pourability and the storage stability of the polymer powder obtained after spray drying (dispersion powder). Antiblocking agents are a constituent of the dispersion powder, particularly when a low glass transition temperature of the polymer, or severe hygroscopy, would lead one to anticipate blocking of the powder or of caking on the dryer wall. The powdering of the particle surface with antiblocking agent also has the particular effect, owing to reduced agglomeration, of reducing the fraction of large granules, and this may have very advantageous consequences for the drying operation and also for the properties of the powder (e.g., pourability and storage stability).

Dispersion powders of these kinds are used in a multitude of applications, including their use in coating materials and in adhesive materials for a very wide variety of substrates. One example of the use of dispersion powders which are not water-redispersible is their use as binding powders for particulate natural materials (e.g. Vinnex® powder from Wacker Chemie AG).

Water-redispersible dispersion powders are in widespread use in chemical construction products, frequently in conjunction with mineral binders (Vinnapas® powder from Wacker Chemie AG). Examples of these products are construction adhesives, especially tile adhesives, renders, and mortar compositions, paints, filling compounds, leveling compounds, thermal insulation composite systems, and jointing mortars. The advantage of the water-redispersible dispersion powders lies in particular in the possibility of using them in prefabricated, storable dry mixes, optionally together with mineral binders such as cement, and of rendering these mixes ready for use by addition of water only immediately before use. Dry mixes of these types are easier to transport than systems in paste form, since the dry mixes have no water fraction. The dry mixes also provide advantages in the context of storage, such as insensitivity to frost and resistance toward microbial infestation, for example.

Dispersion powders are produced in known spray dryers, which can be divided into nozzle atomization dryers and rotary atomization dryers. In the case of nozzle atomization dryers, the polymer dispersion (feed), generally at the top end of the dryer, is atomized under pressure, by means of one or more single-fluid nozzles (pressure nozzles), or is atomized together with pressurized air via one or more two-fluid nozzles or one or more multifluid nozzles. In the case of rotary atomization dryers, the atomization takes place by means of rotary atomizers, in the form of an atomizer disk, cup atomizer, or porous hollow cylinder, for example.

The general procedure is to supply the polymer dispersion to the spray dryer without preheating, at ambient temperature, and to dry it with a hot drying gas. In general the entry temperature of the drying gas is in the temperature range from 100° C. to 200° C. This approach has already been described in numerous instances, as for example in DE 3101413 C2, DE 4406822 A1, DE 19752435 A1, EP 407889 A1, EP 1000113 B1, EP 1110978 B1, EP 1720933 B1, EP 2341084 A1, and WO 01/83071 A1. The reason for this is that aqueous polymer dispersions having a low minimum film-forming temperature (MFFT) of below 60° C., in other words a MFFT typical of aqueous dispersions of thermoplastic polymers, are considered to be very sensitive at high temperature. The same is true of dispersions of emulsion polymers having a low glass transition temperature Tg. For these reasons, therefore, EP 332067 A1 advises spraying the dispersion together with water.

DE 10 2011 080 233 A1 describes a process for preparing dispersion powders wherein the drying gas is preheated to an entry temperature of 130° C. to 210° C. in order to accelerate drying. The polymer dispersion to be dried is preheated to a temperature of 50° C. to 98° C. and is sprayed using rotary atomizers. Chemie Ingenieur Technik 2009, 81, No. 6, 699-716 advises a flash process for temperature-insensitive substances on spraying using single-fluid nozzles, the suspension to be sprayed in this process being heated to a temperature of 120° C. to 200° C.

SUMMARY OF THE INVENTION

It was an object of the invention to provide a process for the spray drying of aqueous polymer dispersions that allows the drying operation to be improved without any detrimental effect on the dried polymer powder (dispersion powder). These and other objects are obtained by the invention, which provides a process for preparing dispersion powders by spray drying of aqueous polymer dispersions of polymers of one or more ethylenically unsaturated monomers selected from the group encompassing vinyl esters, methacrylic esters, acrylic esters, olefins, dienes, vinylaromatics, and vinyl halides, with a drying gas in a nozzle atomization dryer, characterized in that the aqueous polymer dispersion (feed), before being atomized, is preheated under pressure to a temperature of 100° C. to 200° C. and is atomized at this temperature, the pressure being set such that the aqueous phase of the polymer dispersion (feed) does not boil at the temperature selected.

DETAILED DESCRIPTION OF THE PREFERRED EMBODIMENTS

The base polymers for the dispersion powders are introduced for spray drying in the form of their aqueous polymer dispersions. Suitable base polymers for the dispersion powders (polymer powder) are those of one or more ethylenically unsaturated monomers selected from the group encompassing vinyl esters of carboxylic acids having 1 to 15 C atoms, methacrylic esters, acrylic esters of carboxylic acids with unbranched or branched alcohols having 1 to 15 C atoms, olefins, dienes, vinylaromatics, and vinyl halides.

Preferred vinyl esters are vinyl acetate, vinyl propionate, vinyl butyrate, vinyl 2-ethylhexanoate, vinyl laurate, 1-methylvinyl acetate, vinyl pivalate, and vinyl esters of alpha-branched monocarboxylic acids having 5 to 13 C atoms, for example VeoVa9® or VeoVa10® (trade names of Momentive). Particularly preferred is vinyl acetate.

Preferred methacrylic esters or acrylic esters are esters of unbranched or branched alcohols having 1 to 15 C atoms, such as methyl acrylate, methyl methacrylate, ethyl acrylate, ethyl methacrylate, propyl acrylate, propyl methacrylate, n-butyl acrylate, n-butyl methacrylate, 2-ethylhexyl acrylate, and norbornyl acrylate. Particularly preferred are methyl acrylate, methyl methacrylate, n-butyl acrylate, and 2-ethylhexyl acrylate.

Preferred olefins or dienes are ethylene, propylene, and 1,3-butadiene. Preferred vinylaromatics are styrene and vinyltoluene. A preferred vinyl halide is vinyl chloride.

It is optionally possible, in addition, for 0.1 to 10 wt %, based on the total weight of base polymer, of one or more auxiliary monomers to be copolymerized. Examples of auxiliary monomers are ethylenically unsaturated monocarboxylic and dicarboxylic acids, ethylenically unsaturated carboxamides, ethylenically unsaturated sulfonic acids and their salts, precrosslinking comonomers such as polyethylenically unsaturated comonomers, postcrosslinking comonomers such as N-methylolacrylamide, epoxide-functional comonomers, and silicon-functional comonomers.

Examples of suitable homopolymers and copolymers are vinyl acetate homopolymers, copolymers of vinyl acetate with ethylene, copolymers of vinyl acetate with ethylene and one or more further vinyl esters, copolymers of vinyl acetate with one or more further vinyl esters, copolymers of vinyl acetate with ethylene and acrylic ester, copolymers of vinyl acetate with ethylene and vinyl chloride, copolymers of vinyl chloride and ethylene and optionally one or more further vinyl esters, copolymers of styrene with acrylic ester, and copolymers of styrene with 1,3-butadiene. The polymers may further contain auxiliary monomers as described above in the stated amounts, the weight percentages totaling 100 wt % in each case.

Preference is given to vinyl acetate homopolymers; copolymers of vinyl acetate with 1 to 50 wt % of one or more vinyl ester comonomers having 1 to 12 C atoms in the carboxylic acid residue, such as vinyl propionate, vinyl laurate, vinyl esters of alpha-branched carboxylic acids having 5 to 13 C atoms, such as VeoVa9®, VeoVa10®, VeoVa11®; copolymers of vinyl acetate with 1 to 40 wt % of ethylene; copolymers of vinyl acetate with 1 to 40 wt % of ethylene and 1 to 50 wt % of one or more further vinyl ester comonomers having 1 to 12 C atoms in the carboxylic acid residue, such as vinyl propionate, vinyl laurate, vinyl esters of alpha-branched carboxylic acids having 5 to 13 C atoms, such as VeoVa9®, VeoVa10®, VeoVa11®; copolymers of vinyl acetate, 1 to 40 wt % of ethylene and preferably 1 to 60 wt % of (meth)acrylic esters of unbranched or branched alcohols having 1 to 15 C atoms, especially methyl methacrylate, methyl acrylate, n-butyl acrylate, or 2-ethylhexyl acrylate; copolymers with 30 to 75 wt % of vinyl acetate, 1 to 30 wt % of vinyl laurate or vinyl esters of an alpha-branched carboxylic acid having 5 to 13 C atoms, and also 1 to 30 wt % of (meth)acrylic esters of unbranched or branched alcohols having 1 to 15 C atoms, especially methyl methacrylate, methyl acrylate, n-butyl acrylate, or 2-ethylhexyl acrylate, which may further contain 1 to 40 wt % of ethylene; and copolymers with one or more vinyl esters having 1 to 12 C atoms in the carboxylic acid residue, such as vinyl acetate, vinyl propionate, vinyl laurate, vinyl esters of alpha-branched carboxylic acids having 5 to 13 C atoms, such as VeoVa9®, VeoVa10®, VeoVa11®, 1 to 40 wt % of ethylene, and 1 to 60 wt % of vinyl chloride. The polymers may, in each case, further contain auxiliary monomers in the stated amounts. The figures in wt % total 100 wt % in each case.

Preference is also given to (meth)acrylic ester polymers, such as copolymers of n-butyl acrylate or 2-ethylhexyl acrylate or copolymers of methyl methacrylate with n-butyl acrylate and/or 2-ethylhexyl acrylate and optionally ethylene; copolymers of styrene with acrylic esters, preferably with one or more methyl acrylate, ethyl acrylate, propyl acrylate, n-butyl acrylate, and 2-ethylhexyl acrylate comonomers; and copolymers of styrene with 1,3-butadiene. The polymers may also contain the stated auxiliary monomers in the stated amounts, and the figures in wt % total 100 wt % in each case.

The monomer selection or the selection of the weight fractions of the comonomers is preferably made such as to result in a polymer glass transition temperature Tg of −20° C. to +40° C., preferably −20° C. to +20° C. The glass transition temperature Tg of the polymers can be determined in a known way by means of Differential Scanning calorimetry (DSC) in accordance with DIN 53520. The Tg may also be calculated approximately in advance by means of the Fox equation. According to Fox T. G., Bull. Am. Physics Soc. 1, 3, page 123 (1956), the following holds true: $1/Tg=x_1/Tg_1+x_2/Tg_2+ \ldots +x_n/Tg_n$, where $x_n$ is the mass fraction (wt %/100) of the monomer n, and $Tg_n$ is the glass transition temperature, in kelvins, of the homopolymer of the monomer n. Tg values for homopolymers are listed in the Polymer Handbook 2nd Edition, J. Wiley & Sons, New York (1975).

The aqueous dispersions of the polymers generally have a minimum film-forming temperature of 0° C. to +20° C. (measured according to DIN 53787).

Of the homopolymers or copolymers indicated as being preferred, those most preferred are those having a glass transition temperature Tg of −20° C. to +40° C.

The preparation of aqueous polymer dispersions has been widely described before now and is known to the skilled person; for example, in the Encyclopedia of Polymer Science and Engineering, Vol. 8 (1987), John Wiley and Sons, pp. 659-677, and EP 1916275 A1.

The base polymers are prepared preferably by the emulsion polymerization process. The polymerization temperature is preferably between 40° C. and 100° C., more preferably between 60° C. and 90° C. In the case of the copolymerization of gaseous comonomers such as ethylene, 1,3-butadiene, or vinyl chloride, it is also possible to operate under pressure, in general between 5 bar and 100 bar.

The polymerization is preferably initiated using water-soluble initiators or redox initiator combinations that are customary for emulsion polymerization.

The polymerization takes place in the presence of protective colloids and/or emulsifiers. Suitable protective colloids for the polymerization are polyvinyl alcohols; polyvinyl acetals; polyvinylpyrrolidones; polysaccharides in water-soluble form such as starches (amylose and amylopectin), celluloses and their carboxymethyl, methyl, hydroxyethyl, hydroxypropyl derivatives, dextrins and cyclodextrins; proteins such as casein or caseinate, soy protein, gelatin; lignosulfonates; synthetic polymers such as poly(meth)acrylic acid, copolymers of (meth)acrylates with carboxyl-functional comonomer units, poly(meth)acrylamide, polyvinylsulfonic acids and the water-soluble copolymers thereof; melamine-formaldehydesulfonates, naphthalene-formaldehydesulfonates, styrene-maleic acid copolymers, and vinyl ether-maleic acid copolymers. Preference is given to using partially hydrolyzed or fully hydrolyzed polyvinyl alcohols with a degree of hydrolysis of 80 to 100 mol %, especially partially hydrolyzed polyvinyl alcohols having a degree of hydrolysis of 80 to 95 mol % and a Höppler viscosity in 4% strength aqueous solution of 1 to 30 mPas (Höppler method at 20° C., DIN 53015). The protective colloids are generally added in an amount of 1 to 20 wt %, based on the total weight of the monomers, in the polymerization.

Where polymerization takes place in the presence of emulsifiers, the amount of the latter is 1 to 5 wt %, based on the total weight of the monomers. Suitable emulsifiers are anionic, cationic, and nonionic emulsifiers, examples being anionic surfactants such as alkyl sulfates having a chain length of 8 to 18 C atoms, alkyl or alkylaryl ether sulfates having 8 to 18 C atoms in the hydrophobic radical and up to 40 ethylene oxide or propylene oxide units, alkyl- or alkylarylsulfonates having 8 to 18 C atoms, esters and monoesters of sulfosuccinic acid with monohydric alcohols or alkylphenols, or nonionic surfactants such as alkyl polyglycol ethers or alkylaryl polyglycol ethers having 8 to 40 ethylene oxide units.

After the conclusion of the polymerization, post polymerization may be carried out in order to remove residual monomers, employing known techniques, generally by post polymerization initiated with redox catalyst. Volatile residual monomers may also be removed by distillation, preferably under reduced pressure, and optionally with inert entraining gases such as air, nitrogen or steam being passed through or over the reaction mixture.

The aqueous polymer dispersions thusly obtainable have a solids content of 30 to 75 wt %, preferably of 50 to 60 wt %.

For the preparation of the dispersion powders, the aqueous polymer dispersions, optionally after addition of protective colloids as a drying aid to the polymer dispersion, are dried by spray drying. In general the drying aid (protective colloid) is used in a total amount of 0.5 to 30 wt %, based on the base polymer of the dispersion. Suitable drying aids are the substances recited before as protective colloids:

Polyvinyl alcohols; polyvinyl acetals; polyvinylpyrrolidones; polysaccharides in water-soluble form such as starches (amylose and amylopectin), celluloses and their carboxymethyl, methyl, hydroxyethyl, hydroxypropyl derivatives, dextrins and cyclodextrins; proteins such as casein or caseinate, soy protein, gelatin; lignosulfonates; synthetic polymers such as poly(meth)acrylic acid, copolymers of (meth)acrylates with carboxyl-functional comonomer units, poly(meth)acrylamide, polyvinylsulfonic acids and the water-soluble copolymers thereof; melamine-formaldehydesulfonates, naphthalene-formaldehydesulfonates, styrene-maleic acid copolymers, and vinyl ether-maleic acid copolymers. Preference is given to using partially hydrolyzed or fully hydrolyzed polyvinyl alcohols with a degree of hydrolysis of 80 to 100 mol %, especially partially hydrolyzed polyvinyl alcohols having a degree of hydrolysis of 80 to 95 mol % and a Höppler viscosity in 4% strength aqueous solution of 1 to 30 mPas (Höppler method at 20° C., DIN 53015).

As further constituents of the dispersion powders, additional additives may be added to the polymer dispersion in order to tailor the powders for particular applications where appropriate. Examples of such additives are defoamers, hydrophobizing agents, and rheological additives. The polymer dispersion to be supplied to drying, optionally modified with protective colloids and optionally with further additives, is also referred to in the technical jargon as the "feed".

Spray drying takes place by means of atomization in customary spray drying units (nozzle atomization dryers) equipped with single-fluid nozzles (pressure nozzles), two-fluid nozzles or multifluid nozzles, in which the energy for the evaporation of the aqueous phase is transferred by thermal conduction from the drying gas to the polymer dispersion that is to be dried (the feed). The feed is supplied to the nozzles generally by means of pumps. Drying is accomplished by intimate mixing of the atomized polymer dispersion (feed) with the drying gas. Air is generally used as a drying gas. In order to accelerate drying, the drying gas is preheated, preferably to an entry temperature of 130° C. to 210° C. (hot air), more preferably to 150° C. to 190° C. Spray drying takes place preferably in accordance with the cocurrent principle. Here, the polymer dispersion (feed) is atomized in each case by means of one or more single-fluid nozzles (pressure nozzles), two-fluid nozzles or multifluid nozzles, and preferably is atomized by means of single-fluid nozzles (pressure nozzles).

The polymer dispersion (feed), optionally modified with protective colloid and optionally with further additives, is preheated under pressure to a feed temperature of 100° C. to 200° C., preferably 100° C. to 150° C., more preferably 110° C. to 140° C. The pressure here is set such that the feed does not boil at the preheating temperature level. The minimum pressure required for this to be the case at the temperature in question for the aqueous polymer dispersion (feed) may be estimated in a known way, for example, from the widely published phase diagram (p-T diagram) for water (for example, on the Internet page of London South Bank University:
http://www.lsbu.ac.uk/water/phase.html).

The heating may take place, for example, on the suction side or on the pressure side of a pump which conveys the feed to the nozzles. Pressures applied on the suction side are generally up to 20 bar abs., preferably up to 10 bar abs. The pressure prevailing on the pressure side of the pump is the atomization pressure, generally 10 to 200 bar abs., preferably 30 to 150 bar. Also practicable is the combination of heating on the suction side and pressure side of the pump. Heating may take place in one stage or in a plurality of stages. The feed may be heated using heat exchangers. The feed may also be heated by introduction of steam into the polymer dispersion. Suitable heat exchangers are known to the skilled person and generally available. Examples are plate-type or shell-and-tube heat exchangers in cocurrent, countercurrent, or cross-flow versions. The feed may be heated in one or more stages, with one-stage heat exchangers being preferred. Particularly preferred are countercurrent plate-type heat exchangers, on account of their easy disassembly and cleaning.

The polymer dispersion (feed) and the drying gas are supplied at the top end of the spray dryer, generally a cylindrical tower (dryer tower) having a volume of up to several hundred cubic meters. There are various possible configurations for the dryer outlet at the bottom end of the spray dryer: for example, the dried polymer powder is discharged with the drying gas and isolated by means of a filter separator and/or cyclone separator. The exit temperature of the drying gas is preferably 45° C. to 120° C., depending on unit, resin Tg, and desired degree of drying.

The dispersion powders may further comprise antiblocking agents. Suitable antiblocking (anticaking) agents are known to the skilled person, examples being aluminum silicates such as kaolin, bentonite, fumed silica or precipitated silica, which may optionally have been rendered hydrophobic, or talc, clays, light spar, carbonates such as calcium carbonate, magnesium carbonate, and Ca/Mg carbonate, and barium sulfate. Mixtures of antiblocking agents may also be used. The antiblocking agents are used in general in an amount of 0.1 to 30 wt %, preferably 2 to 30 wt %, more preferably 7 to 30 wt %, based in each case on the total weight of the polymeric constituents of the polymer dispersion to be atomized. In the case of fumed silica or precipitated silica, preference is given to using 0.1 to 2 wt %, based on the polymeric constituents of the polymer dispersion to be atomized. The fraction of the polymeric constituents of the polymer dispersion to be atomized is composed of the base polymer of the polymer dispersion and, optionally, the protective colloid fraction.

The antiblocking agent may be added at least partly continuously and cocurrently, but spatially separately from the polymer dispersion (feed) to be atomized. For this purpose, the antiblocking agent is conveyed into the dryer tower, preferably at the top end, for drying, by means of a conveying gas, generally air (conveying air), in a conveying line. Optionally the antiblocking agent may also be added wholly or partly to the fully dried polymer powder before or after it is separated from the drying gas.

The dispersion powders obtainable by the process of the invention can be used for example in chemical construction products in conjunction with inorganic, hydraulically setting binders such as cements (Portland, high-alumina, trass, blast furnace, magnesia, and phosphate cement), gypsum, and waterglass, for the production of structural adhesives, renders, filling compounds, floor-filling compounds, jointing mortars, and paints. Additionally they may be used as binders for coating materials, examples being emulsion paints and powder paints, and as binders in bonding agents, for wood, cardboard, paper, and fiber materials, for example, and especially in wood adhesives, wood-floor adhesives, packaging adhesives, and bookbinding adhesives. A further application is as binders for textiles and paper. The dispersion powders obtainable by the process of the invention are also suitable as binders for particulate materials such as fiber materials or particulate materials composed of mineral materials, plastics, or natural substances such as woodchips, cork particles, glass particles or glass powder, or combinations of these materials.

With the process according to the invention, distinct performance increases are achieved in throughput in the production of the dispersion powders by spray drying, and also in the product quality of the dispersion powders, on the basis of a number of factors.

In prior-art processes with feed temperatures below 100° C., a fairly large quantity of heat must first be transferred from the hot drying air onto the "cold" feed droplets in order to bring about the evaporation of water. With the process of the invention, in contrast, a large part of the quantity of heat needed for evaporation is already present in the feed. As a result of the more efficient energy distribution, e.g. heat already in the droplet instead of heat being transferred from the air to the droplet, droplet drying is quicker.

With the process of the invention, the energy supplied to the drying operation (total energy per unit time) is increased without any need for an increase in the temperature of the hot drying air. This is of greater advantage particularly in the case of temperature-sensitive products, which is generally characteristic of dispersion powders.

In addition to the increase in the dryer capacity, a contribution to improved product quality is obtained. A key contribution to product quality and energy efficiency is also obtained with the increased feed temperature because there is also a reduction in feed viscosity proportional to the level of preheating of the feed. Finer droplets are formed, and dry more quickly because of the greater droplet surface area of the atomized liquid. This, surprisingly, also has a positive effect on product quality: fewer powder agglomerates are formed as a consequence.

Given that the process of the invention allows the atomization of feeds with higher viscosity and correspondingly higher feed solids content, the specific energy consumption per unit quantity of powder is markedly reduced, since the amount of water to be evaporated is substantially reduced.

The viscosity of the feed is temperature-dependent and decreases with increasing temperature. The atomization behavior of nozzle atomization, such as the droplet size distribution, for example, is dependent on factors including the feed viscosity. With the process of the invention it is possible to achieve good atomization results with feeds of higher viscosity, whereas inadequate atomization or insufficient powder properties have been obtained with relatively high-viscosity feeds at feed temperatures below 100° C.

Surprisingly, it has not been possible to observe any decomposition in the polymers. Even in the case of polymers with ester groups which are sensitive to hydrolysis, such as polymers containing vinyl acetate, for example, there is no significant elimination of the acetate group. Another surprise was that the blocking stability of the polymers dried in accordance with the invention is not adversely affected. Despite the thermal load present during preheating of the dispersion and on contact with the drying gas, in each case at temperatures above 100° C. and hence well above the glass transition temperature Tg of the polymers (for example, vinyl acetate-ethylene copolymers with a Tg around 0° C.) or the glass transition temperature Tg of the drying aid (for example, polyvinyl alcohol with a Tg of about 70° C.), no caking or agglomeration of the polymer particles was observed. The redispersion quality is not impaired by the process of the invention; instead, to the contrary, there are improvements with respect to redispersibility and blocking resistance, as shown by the examples.

The examples which follow serve for further elucidation of the invention:

Methods for Assessing Dispersion Powder Quality:

Blocking Test for Determining the Blocking Stability:

For the determination of the blocking stability, the dispersion powder in question was introduced into an iron tube with screw closure and then loaded with a metal die. The tube was stored under load in a drying cabinet at 50° C. for 16 hours. After cooling to room temperature had taken place, the powder was removed from the tube and the blocking stability was determined qualitatively by crushing of the respective powder. The blocking stability was classed as follows:

1=very good blocking stability
2=good blocking stability
3=satisfactory blocking stability, slightly agglomerated powder
4=not stable to blocking, powder cannot be crushed or is no longer free-flowing after crushing.

Test of Redispersing Behavior—Redispersion:

The settling behavior of the redispersion (redispersing behavior) serves as a measure of the redispersibility of the powders. First of all, the dispersion powders were each redispersed in water, under the action of strong shearing forces in a mortar mill (e.g., from Retsch). A redispersion with a solids content of 50 wt % was prepared. Then the redispersion was diluted in each case to a solids content of 0.5 wt %. The settling behavior was then determined on the diluted redispersions. For this purpose, 100 ml of each of these redispersions were introduced into a graduated tube, and the settled height of solid was measured. The measurement results, in mm sediment after 24 hours, were classed as follows in order to qualify the redispersion:

1=very good redispersion (sediment less than 1.0 mm)
2=good redispersion (sediment 1.0 mm to 2.0 mm)
3=moderate redispersion (sediment 2.0 mm to 5.0 mm)
4=poor redispersion (sediment greater than 5.0 mm)

Method for Determining the Residual Moisture Content of the Dispersion Powder:

The residual moisture content of the dispersion powder was measured in a method based on DIN EN ISO 3251. In deviation from the standard, 5 g to 6 g of dispersion powder in each case were dried at 115° C. to constant weight on an aluminum dish in a halogen dryer (from Mettler Toledo, model HR 73 or HB 43). The loss of mass in wt % corresponds to the residual moisture fraction of the dispersion powder in wt %.

Method for Determining the Particle Size (Median) of the Dispersion Powder:

The particle size was measured by laser diffraction using the LS 100Q laser diffraction apparatus with drying module from Beckman Coulter in accordance with the instrument protocol.

Method for Determining the Bulk Weight of the Dispersion Powder:

The bulk weight (bulk density) was determined by the method according to standard EN ISO 60.

Method for Determining the Viscosity:

The viscosity of the dispersion or feed was measured after conditioning to 23° C. with a Brookfield viscometer (DV Prime) at 20 rpm using the standard spindle required according to manufacturer specification.

Method for Determining the Solids Content:

The solids content of the dispersion or feed was measured in a method based on DIN EN ISO 3251 (aluminum foil, 20 min at 110° C. in a drying cabinet).

Example 1

An aqueous vinyl acetate-ethylene copolymer dispersion (Tg=about +15° C., solids content about 54%) was admixed with 9 wt % of polyvinyl alcohol, based on copolymer, in the form of a 20 wt % strength aqueous polyvinyl alcohol solution. The polyvinyl alcohol had a Höppler viscosity of 4 mPas (in 4% strength aqueous solution, Höppler method at 20° C., DIN 53015) and a degree of hydrolysis of 88 mol %. This was followed by dilution with water and the setting of a feed solids content of 43.0 wt %. The feed viscosity at 23° C. was 180 mPas.

Prior to spray drying, the feed was heated in each case to the temperature specified in Table 1, with the heating taking place on the pressure side of a high-pressure pump by means of heated oil bath and tube heat exchanger.

Spray drying took place in a commercial spray drying tower with a single-fluid nozzle (pressure nozzle) in cocurrent with drying air having a drying air entry temperature of about 136° C. and a drying air exit temperature of about 85° C. The atomizing pressure was about 30 bar (i.e., the pressure on the pressure side of the high-pressure pump). In the course of drying, 10 wt % of antiblocking agent (1:1 mixture of kaolin and calcium carbonate) was added to the drying gas in each case, based in each case on the polymeric constituents of the feed dispersion.

TABLE 1

| Example | T(feed) (° C.) | Median (μm) | Residual moisture content (%) | Blocking test | Bulk weight (g/L) | Redispersion |
|---|---|---|---|---|---|---|
| 1.1[1] | 45 | 123 | 1.3 | 3 to 4 | 441 | poor |
| 1.2[1] | 76 | 100 | 0.7 | 3 | 482 | poor |
| 1.3[1] | 94 | 119 | 0.7 | 1 to 2 | 520 | moderate |
| 1.4 | 104 | 112 | 0.7 | 1 | 566 | good |
| 1.5 | 110 | 109 | 0.6 | 1 | 573 | good |
| 1.6 | 119 | 110 | 0.6 | 1 | 582 | good |
| 1.7 | 130 | 108 | 0.7 | 1 | 580 | very good |
| 1.8 | 140 | 100 | 0.9 | 2 | 559 | very good |

[1]Comparative Example

In Table 1, the dispersion powders prepared at relatively low feed temperatures of 40° C. and 76° C. show a distinct lack of blocking stability and redispersion quality. Only with further increasing feed temperatures did these powder quality properties become better. Very surprisingly, by increasing the feed temperature above 100° C., a further improvement was achieved in powder quality. Not only were the blocking stability and redispersion improved significantly; the bulk weight of the powder was also increased.

Example 2

The procedure of Example 1 was repeated, but the feed at 23° C. had a higher feed solids content of 44.7 wt % and a higher feed viscosity of 340 mPas at 23° C. The atomizing pressure was raised to about 60 bar. The feed temperature was varied in each case from 40° C. to 130° C. The results are summarized in Table 2.

TABLE 2

| Example | T(feed) (° C.) | Median (μm) | Residual moisture content (%) | Blocking test | Bulk weight (g/L) | Redispersion |
|---|---|---|---|---|---|---|
| 2.1[1] | 40 | atomization not possible | none | none | none | none |
| 2.2[1] | 74 | 94 | 1.8 | 4 | 460 | poor |
| 2.3[1] | 96 | 80 | 0.5 | 1 to 2 | 533 | moderate |
| 2.4 | 118 | 88 | 0.5 | 1 | 558 | good |
| 2.5 | 130 | 82 | 0.5 | 1 | 563 | good |

[1]Comparative Example

In comparison to Example 1, the feed solids content and consequently the feed viscosity were raised in Example 2. If the viscosity is too high, droplet formation at the pressure nozzle may be disrupted or may be completely absent. In Example 2, in spite of increased atomization pressure (60 bar instead of 30 bar), no atomization was achievable at 40° C. feed temperature, and the results at 74° C. and 96° C. as well were inadequate.

As in Example 1, it was possible to achieve distinct improvements in the powder and redispersion properties with feed temperatures above 100° C. in Example 2 as well. Owing to the drying of a feed with higher viscosity, in other words higher solids content, there was also a reduction in the specific energy consumption relative to Example 1.

Example 3

The procedure of Example 2 was repeated, but the feed had an even higher feed solids content of 46.3 wt % and an even higher feed viscosity of 550 mPas at 23° C. The atomizing pressure remained at about 60 bar. The feed temperature was varied from 40° C. to 129° C. The results are summarized in Table 3.

TABLE 3

| Example | T(feed) (° C.) | Median (μm) | Residual moisture content (%) | Blocking test | Bulk weight (g/L) | Redispersion |
|---|---|---|---|---|---|---|
| 3.1[1] | 40 | atomization not possible | none | none | none | none |
| 3.2[1] | 74 | atomization not possible | none | none | none | none |
| 3.3[1] | 96 | 104 | 1.7 | 3 to 4 | 451 | poor |
| 3.4 | 115 | 92 | 0.9 | 2 | 537 | good |
| 3.5 | 129 | 87 | 0.8 | 2 | 525 | good to very good |

[1]Comparative Example

In the case of the feed used in Example 3 with a high solids content of 46.3%, it was impossible to produce an acceptable dispersion powder by spray drying at feed temperatures below 100° C. Even at 96° C. feed temperature, the powder was very moist, not stable to blocking, and poor in redispersion. Only the heating of the feed above 100° C. produced effective atomization and, consequently, good dispersion powders. Since the solids content of the feed was increased, less water, specifically, had to be evaporated, and the specific energy consumption decreased further relative to Examples 1 and 2.

Example 4

An aqueous vinyl chloride/ethylene/vinyl laurate copolymer dispersion (Tg=about 0° C., dispersion solids content about 50 wt %) was admixed with 10 wt % of polyvinyl alcohol, based on copolymer, in the form of a 10 wt % strength aqueous polyvinyl alcohol solution. The polyvinyl alcohol had a Höppler viscosity of 23 mPas (in 4% strength aqueous solution, Höppler method at 20° C., DIN 53015) and a degree of hydrolysis of 88 mol %. This was followed by dilution with water and the setting of a feed solids content of 29.3 wt %. The feed viscosity at 23° C. was 150 mPas.

The heating of the feed and the spray drying were carried out in the same way as in Example 1. The feed temperature was varied from 40° C. to 131° C. The results are summarized in Table 4.

TABLE 4

| Example | T(feed) (° C.) | Median (μm) | Residual moisture content (%) | Blocking test | Bulk weight (g/L) | Redispersion |
|---|---|---|---|---|---|---|
| 4.1[1] | 40 | atomization not possible | none | none | none | none |
| 4.2[1] | 96 | 151 *) | 1.9 | 4 | 392 | moderate |
| 4.3 | 110 | 135 | 1.2 | 2 to 3 | 429 | good |
| 4.4 | 131 | 122 | 1.0 | 2 | 439 | good |

*) copious residue on sieving, large lumps –> very moist material sieved off
[1]Comparative Example As Example 4 shows, the inventive increase in the feed temperature can be employed even for particularly temperature-sensitive dispersion powders such as a vinyl chloride copolymer, without adversely affecting the powder quality or redispersion quality.

Example 5

In analogy to Example 1, a feed with a solids content of 42.5 wt % and a feed viscosity of about 150 mPas at 23° C. was produced. Spray drying took place in a large, commercial spray drying tower with a plurality of single-fluid nozzles (pressure nozzles) on the cocurrent principle. The drying air entry temperature was about 160° C., the drying air exit temperature about 80° C. The atomizing pressure was about 100 bar. Heating of the feed to the levels indicated in Table 5 (70° C. to 115° C.) took place on the suction side of a high-pressure pump by means of a multi-ply plate-type heat exchanger on the countercurrent principle. The results are summarized in Table 5.

TABLE 5

| Example | T(feed) (° C.) | Median (μm) | Residual moisture content (%) | Blocking test | Bulk weight (g/L) | Redispersion | Relative dryer performance in % |
|---|---|---|---|---|---|---|---|
| 5.1[1] | 70 | 180 | 1.0 | 3 to 4 | 415 | moderate to good | 100% |

TABLE 5-continued

| Example | T(feed) (° C.) | Median (μm) | Residual moisture content (%) | Blocking test | Bulk weight (g/L) | Redispersion | Relative dryer performance in % |
|---|---|---|---|---|---|---|---|
| 5.2[1] | 86 | 158 | 0.8 | 2 to 3 | 446 | good | 106% |
| 5.3[1] | 93 | 157 | 0.8 | 2 | 442 | good | 107% |
| 5.4[1] | 98 | 147 | 0.8 | 2 | 458 | good | 109% |
| 5.5 | 104 | 148 | 0.8 | 2 | 461 | good | 112% |
| 5.6 | 115 | 141 | 0.7 | 1 to 2 | 470 | good to very good | 114% |

[1]Comparative Example

The results in Table 5 show that on spray drying of the feeds heated to above 100° C., the powder properties of the resultant dispersion powders underwent improvement, and a distinct increase in the dryer performance was possible.

The invention claimed is:

1. A process for preparing dispersion powders, comprising:
spray drying an aqueous polymer dispersion feed of one or more polymers of one or more vinyl ester, methacrylic ester, acrylic ester, monoolefin, diene, vinylaromatic, or vinyl halide monomer(s) or comonomer(s), the polymers having a glass transition temperature Tg of from −20° C. to +40° C., with a drying gas in a nozzle atomization dryer, further comprising preheating the aqueous polymer dispersion feed under pressure to a temperature of 100° C. to 200° C. before atomizing, and atomizing at this temperature, the pressure being such that the aqueous phase of the polymer dispersion does not boil at the preheating temperature.

2. The process of claim 1, wherein the aqueous polymer dispersion feed, before being atomized, is preheated under pressure to a temperature of 100° C. to 150° C.

3. The process of claim 1, wherein the aqueous polymer dispersion feed, before being atomized, is preheated under pressure to a temperature of 110° C. to 140° C.

4. The process of claim 1, wherein the aqueous polymer dispersion is atomized in a nozzle atomization dryer by means of one or more single-fluid nozzles, one or more two-fluid nozzles, or one or more multifluid nozzles.

5. The process of claim 2, wherein the aqueous polymer dispersion is atomized in a nozzle atomization dryer by means of one or more single-fluid nozzles, one or more two-fluid nozzles, or one or more multifluid nozzles.

6. The process of claim 1, wherein the preheating takes place under pressure on a suction side or a pressure side of a pump which conveys the aqueous polymer dispersion feed to the nozzles.

7. The process of claim 6, wherein the preheating takes place on the suction side of the pump at a pressure of up to 20 bar abs.

8. The process of claim 6, wherein the preheating takes place on the pressure side of the pump at a pressure of 10 to 200 bar abs.

9. The process of claim 6, wherein the drying gas is preheated to an entry temperature of 130° C. to 210° C.

10. The process of claim 1, wherein the aqueous polymer dispersion spray dried comprises at least one polymer selected from the group consisting of vinyl acetate homopolymers, copolymers of vinyl acetate with ethylene; copolymers of vinyl acetate with ethylene and one or more further vinyl esters; copolymers of vinyl acetate with one or more further vinyl esters; copolymers of vinyl acetate with ethylene and acrylic ester; copolymers of vinyl acetate with ethylene and vinyl chloride; copolymers of vinyl chloride and ethylene and optionally one or more further vinyl esters; copolymers of styrene with acrylic ester; and copolymers of styrene with 1,3-butadiene, the polymers optionally containing 0.1 to 10 wt %, based on the total weight of the polymer, of one or more auxiliary monomers in copolymerized form.

* * * * *